United States Patent [19]

Corona

[11] Patent Number: 4,827,313

[45] Date of Patent: May 2, 1989

[54] MECHANISM AND METHOD FOR CONTROLLING THE TEMPERATURE AND OUTPUT OF AN AMALGAM FLUORESCENT LAMP

[75] Inventor: Stephen C. Corona, Rochester, N.Y.

[73] Assignee: Xerox Corporation, Stamford, Conn.

[21] Appl. No.: 217,182

[22] Filed: Jul. 11, 1988

[51] Int. Cl.[4] ........................ G03B 27/52; G03B 27/72

[52] U.S. Cl. ........................................ 355/30; 355/69; 313/490; 313/15

[58] Field of Search ............................ 355/67, 69, 30; 315/241 P, 309, DIG. 5, DIG. 7; 313/13, 15, 44, 490; 362/84

[56] References Cited

U.S. PATENT DOCUMENTS 3,779,640 12/1973 Kidd ........................................ 355/8
4,233,653 11/1980 Jongerius et al. .............. 313/490 X
4,751,551 6/1988 Beiter et al. .......................... 355/30

FOREIGN PATENT DOCUMENTS 59-42534 3/1984 Japan .
62-217033 2/1987 Japan .

*Primary Examiner*—L. T. Hix
*Assistant Examiner*—D. Rutledge

[57] ABSTRACT

An amalgam fluorescent lamp is operated under high output and loading conditions by implementation of a control circuit to monitor and adjust lamp temperature. A variable density multi-element heater sleeve is connected to a controller which monitors the sleeve temperature and adjusts the power input to one or more of the sleeve segments. A separate control circuit maintains the lamp illumination output at a programmed level by monitoring a detected level of lamp output and comparing it with a pre-established reference signal.

9 Claims, 5 Drawing Sheets

MECHANISM AND METHOD FOR CONTROLLING THE TEMPERATURE AND OUTPUT OF AN AMALGAM FLUORESCENT LAMP

BACKGROUND AND MATERIAL INFORMATION DISCLOSURE

This invention relates to an illumination system and, more particularly, to an extra high output (EHO) amalgam fluorescent lamp and an associated control system to operate the lamp under optimum operating conditions.

Low pressure, mercury vapor fluorescent lamps are used in a variety of lighting applications. Of particular interest, for purposes of the present invention, is the widespread use of fluorescent lamps to illuminate documents being copied in a reprographic device.

In a conventional mercury fluorescent lamp, an electrical discharge is generated in a mixture of mercury vapor at low pressure and a fill gas typically argon, neon, Krypton, xenon or mixtures thereof. The light output from the lamp depends, among other variables, on the mercury vapor pressure inside the lamp tube. It is known in the prior art that the optimum mercury pressure for maximum light output of a fluorescent lamp approximately 7 mtorr (independent of current) which corresponds to a mercury cold spot temperature of 35° C. At this temperature and pressure, the light output increases monotonically with the current. At cold spot temperatures higher or lower than the optimum, light output falls off. It is therefore desirable to maintain the mercury pressure at the optimum at any lamp current and at any ambient temperature. Prior art techniques for accomplishing this function typically require a temperature-sensitive device such as a thermocouple, thermistor or thermostat to monitor the temperature of the cold spot. A feedback circuit provided closed loop control of a temperature-regulating device to maintain the optimum mercury pressure.

For certain document reproduction applications, it is desirable to operate the illumination source at extremely high loadings. In the prior art applications mentioned above, the power loading is typically 40 watts, whereas power loadings up to 120 watts may be required for certain applications. At this increased loading, the lamp wall temperature is greatly increased, requiring the use of active cooling devices such as fans and the like. Additionally, the lamp is very sensitive to its axial thermal temperature profile. Deviation from optimum can cause wide variation in light output along the length of the lamp.

In order to achieve better thermal control of a fluorescent lamp at high loading, it is known to incorporate an amalgam-forming material such as an indium patch, within the lamp envelope. The indium forms an amalgam with the mercury, thus chemically containing the mercury within the amalgam. The temperature at which mercury is released from the amalgam is significantly higher (approximately 100° C.) than the optimum lamp wall temperature of the conventional non-amalgam lamp (35° C.). (The actual temperature is adjustable by the amalgam material composition.) Thus, use of the amalgam fluorescent lamp eliminates the need for active cooling devices. However, there is a need for a control system to control the optimum thermal operating point of the lamp. The present invention is directed towards a control system which controls the temperature at a profiled power density lamp heater sleeve and adjusts the input power to the lamp through a feedback circuit.

More particularly, the invention relates to a monitoring and control system for an amalgam fluorescent lamp, said system including a multi-element lamp heater sleeve adapted to control the amalgam temperature and to provide a non-uniform power density axially across the lamp and control means for sensing temperature along a plurality of areas of said heater sleeve and for adjusting the temperature at each of said areas.

The following prior art publications have been identified as disclosing various types of temperature control means for non-amalgam type of fluorescent lamps.

U.S. Pat. No. 3,779,640 to Kidd discloses temperature control means for a fluorescent lamp used in electrophotographic printing. Control means include a heater sleeve and blower responsive to a thermostat positioned on the lamp wall. Circuit means in conjunction with the thermostat can de-energize the heater sleeve to maintain the lamp temperature within a 10° F. range.

Japanese Pat. No. 61-217033 to Tanaka discloses a temperature-sensing element on the wall of a fluorescent photocopier lamp. When the sensing element detects the lamp to be at a preset temperature, the copier turns on automatically.

Japanese Pat. No. 59-42534 to Ishikawa discloses a fluorescent lamp with separate heaters at its center and ends. A patch in the center of the lamp detects temperature variation and separate controls allow the heat supply to the ends to be adjusted when their temperature rises.

BRIEF DESCRIPTION OF THE DRAWINGS

Referring now to FIGS. 1 and 1A, there is shown an optical scanning system for a document reproduction machine which incorporates an amalgam fluorescent lamp with the associated control circuitry of the present invention. As shown, an original document 10 is positioned facedown on a transparent platen 12. Optical assembly 16 contains the optical components which incrementally scan-illuminate the document from left to right and project a reflected image onto a photosensitive medium 20. Medium 20, in this embodiment, is a belt-type photoreceptor but may also be a drum-type photosensor or a linear multi-element photosensor array such as a CCD array. Optical assembly 16 comprises an elongated amalgam fluorescent lamp 22 and associated reflector 24. Lamp 22 and reflector 24, along with scan mirror 26 are adapted to travel, as a unit, along a path parallel to, and beneath the platen. Lamp 22, in conjunction with reflector 24, illuminates an incremental line portion of document 10 through a clear area 25. A lamp heater sleeve 23 described in greater detail in the description accompanying FIGS. 2–4, is fitted to the outer surface of the lamp envelope, covering the lamp envelope except for clear area 25. The reflected image is reflected by scan mirror 26, to a corner mirror assembly 28, adapted to move at ½ the rate of mirror 26. The document image is projected along the optical path and is projected, by lens 30, onto the surface of medium 20 via a second corner mirror assembly 32 and mirror 34 to form an electrostatic latent image corresponding to the information areas contained on document 10. The latent image can then be developed and transferred to an output medium and fixed, using known xerographic principles. It is understood that if the photosensitive medium is a photosensor array, related signals corresponding to the scanned image are stored and processed for subsequent printout.

Figure 1:
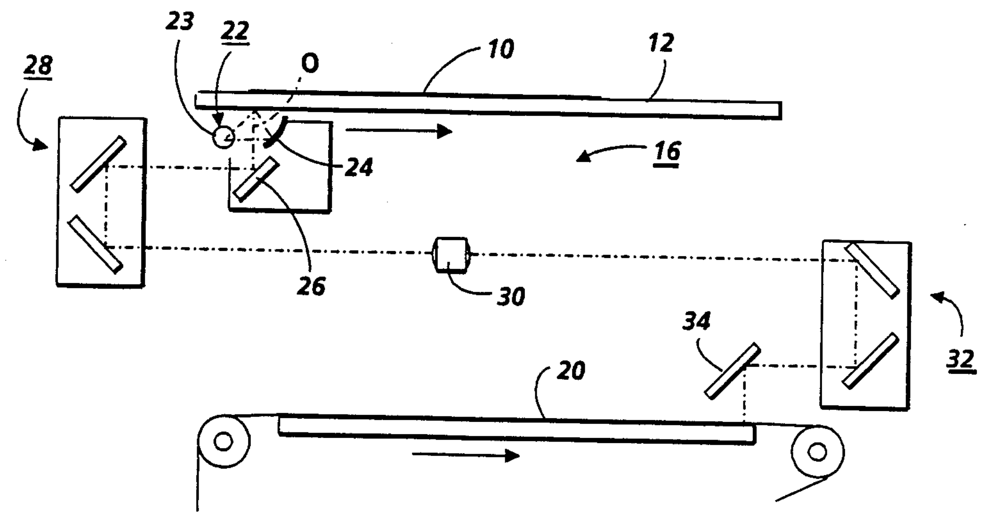
FIGS. 1 and 1A disclose, in side view, a document scanning system incorporating an amalgam lamp whose output and temperature is controlled according to the principles of the present invention.
Figure 1A:
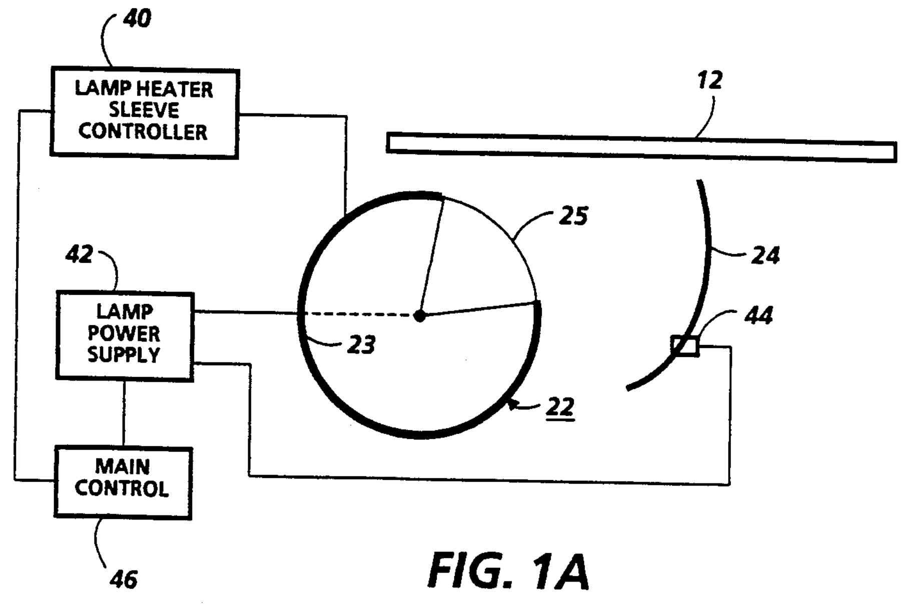

Continuing with the description, the lamp heater sleeve controller 40 is connected to lamp heater sleeve 23. High frequency lamp power supply 42 provides power to lamp 22, the power adjustable in response to signals from photodetector 44 positioned to view the output of lamp 22. The operation of power supply 42 is further regulated by main machine controller 46. The operation of the control system will be discussed in further detail below.

Figure 4:
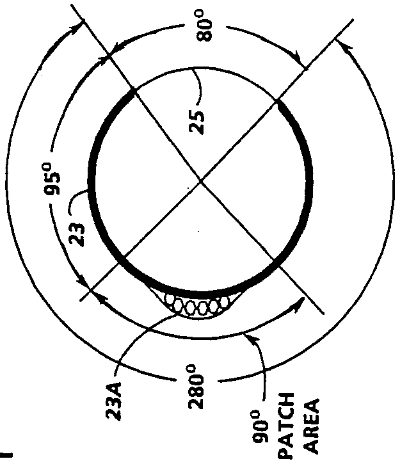
FIG. 4 is an end view of the lamp with sleeve.
Figure 2:
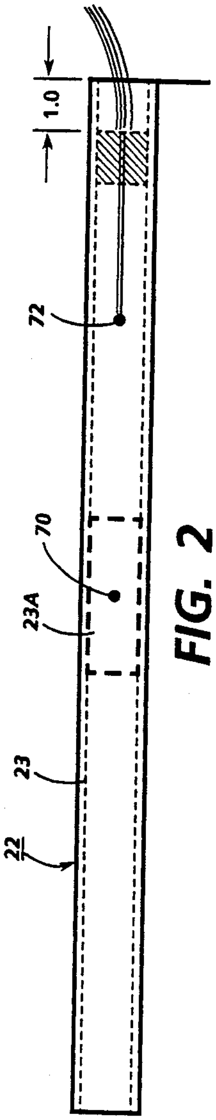
FIG. 2 is an end view of the amalgam lamp showing the heater sleeve.
Figure 3:
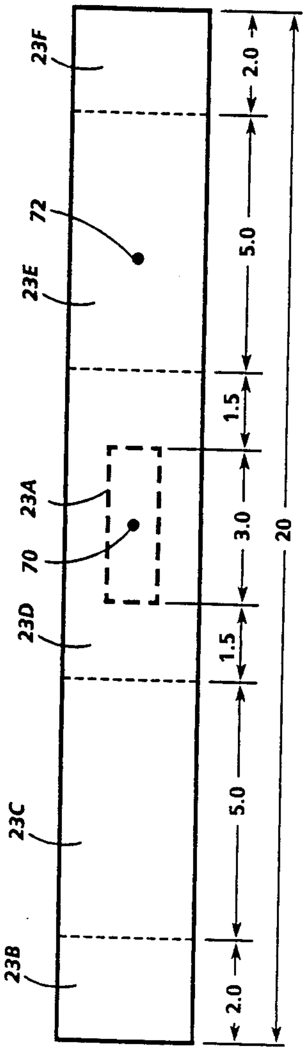
FIG. 3 is an unwrapped end view of the lamp heater sleeve.

Turning now to a more detailed consideration of lamp 22 and its heater sleeve 23, FIG. 2 shows a side view of the lamp heater sleeve 23, and FIG. 3 an "unwrapped" side view and FIG. 4 an enlarged end view. In a preferred embodiment, lamp 22 is a 24.5 inch long Tri Phosphor, Extra High Output (EHO) amalgam fluorescent lamp operating at a loading of up to 120 watts. The amalgam is formed by mercury combining with an indium patch within the lamp envelope. The optimum mercury pressure is achieved with the amalgam at approximately 88° to 100° C. Heater sleeve 23 is mechanically secured to the lamp envelope over its entire surface (excluding the lamp aperture 25) and has the function of transferring heat to the lamp. Lamp heater sleeve 23, in a preferred embodiment, is constructed of etched foil heating elements and a laminate of homex and polymide resin. A first patch element 23A is positioned adjacent to the amalgam patch within the lamp. A second sleeve element, comprising sections 23B–F connected in series and extending the length of the lamp is best shown in FIG. 3. Lamp heater sleeve elements 23B–F are designed for this embodiment, to operate from a 115 vac power source at a nominal loading of 100 watts. The sleeve element has a graduated power density profile across the axial length of the lamp so as to provide less power at the ends of the lamp to improve lamp axial illumination stability. Patch element 23A operates from a 12 vdc source and dissipates approximately 12 watts. As shown in FIG. 4, the patch element 23A is wrapped around 90° of the lamp surface; elements 23B–F are wrapped around 280° of surface. Aperture 25 of the lamp faces the image area document platen and permits the illumination output to exit directly towards the document to be illuminated.

As shown in FIGS. 2 and 3, patch thermistor 70 and sleeve thermistor 72 are permanently mounted to patch element 23A and to sleeve element 23E respectively, with a thermally conductive adhesive. These thermistors, as will be described below, provide information to the heater sleeve controller 40.

Figure 5:
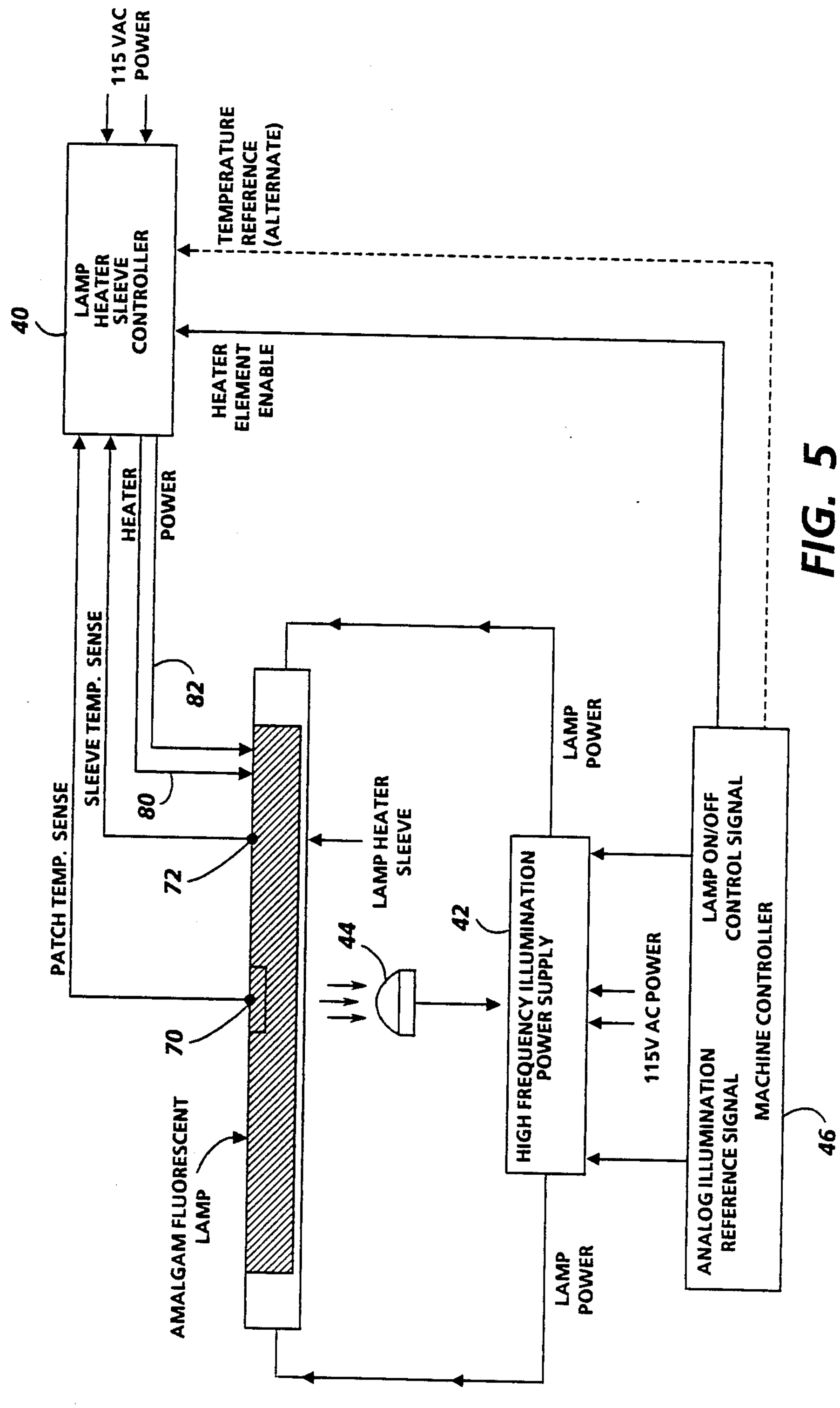
FIG. 5 is a block diagram of the control circuit for controlling the temperature and output of the lamp.

Turning now to FIG. 5, it is seen that there are two main control circuits monitoring and adjusting the lamp. Illumination power supply 42, in conjunction with input from photodetector 44, maintains the lamp at proper illumination levels. Heater sleeve controller 40 maintains the sleeve and patch temperatures at optimum temperatures levels based on inputs from thermistors 70 and 72. Circuits 40 and 42 are under the overall control of machine controller 46.

Turning first to operation of the illumination power supply circuit 42, the circuit is connected to a 115 vac power source. The circuit contains a computer circuit which compares an analog reference signal received from controller 46 with an analog illumination intensity signal generated by photodetector 44 during lamp operation. The reference signal represents the desired illumination output level of the lamp. Due to factors such as print mode, photosensitive differences; machine "dirt" and magnification changes in the optical system, the illumination level may change from the established reference. The input power to the lamp will, in this case be adjusted until the desired illumination output level is reestablished.

Lamp heater sleeve controller circuit 40 has the function of controlling heater power to the lamp heater sleeve. The temperature requirements may vary as a function of operational mode. The sleeve elements 23B–F operate from a 115 vac source and the patch element 23A from a 12 vdc source. Each heater area, as previously mentioned, has unique power densities and resistances. Thermistor 70 senses the temperature at the patch element 23A; thermistor 72 at sleeve element 23E. Each thermistor sends analog output signals to control circuits produced by controller 40. These signals are compared with reference signals maintained from controller 40 or alternately supplied by machine controller 46. Upon detecting deviation from desired temperature levels, controller 40 supplies voltage to heater power input lines 80 and/or 82.

EXAMPLE

For one exemplary design, a tri-phosphor indium amalgam fluorescent lamp, 24.5 inches in length, was used as the illumination source for a document illumination system. The lamp was 1.02 inches in diameter and the heater sleeve was 20 inches long. The following table shows the physical properties and power loading of the patch and non-patch elements of the heater sleeve.

TABLE

| | "WRAP" WIDTH | LENGTH | AREA | AREA POWER | POWER DENSITY | ELEMENT RESIS. | ELEMENT VOLTAGE |
|---|---|---|---|---|---|---|---|
| AREA 23B | 2.49 | 2.00 | 4.98 | 6.23 | 1.25 | 8.29 | 7.19 |
| AREA 23C | 2.49 | 5.00 | 12.46 | 24.92 | 2.00 | 33.16 | 28.75 |
| AREA 23D | 2.49 | 6.00 | 14.95 | 37.38 | 2.50 | 49.75 | 43.13 |
| AREA 23E | 2.49 | 5.00 | 12.46 | 24.92 | 2.00 | 33.16 | 28.75 |
| AREA 23F | 2.49 | 2.00 | 4.98 | 6.23 | 1.25 | 8.29 | 7.19 |
| AREA 23A (PATCH) | 0.80 | 3.00 | 2.40 | 9.01 | 3.75 | 15.98 | 12.00 |

Figure 6A:
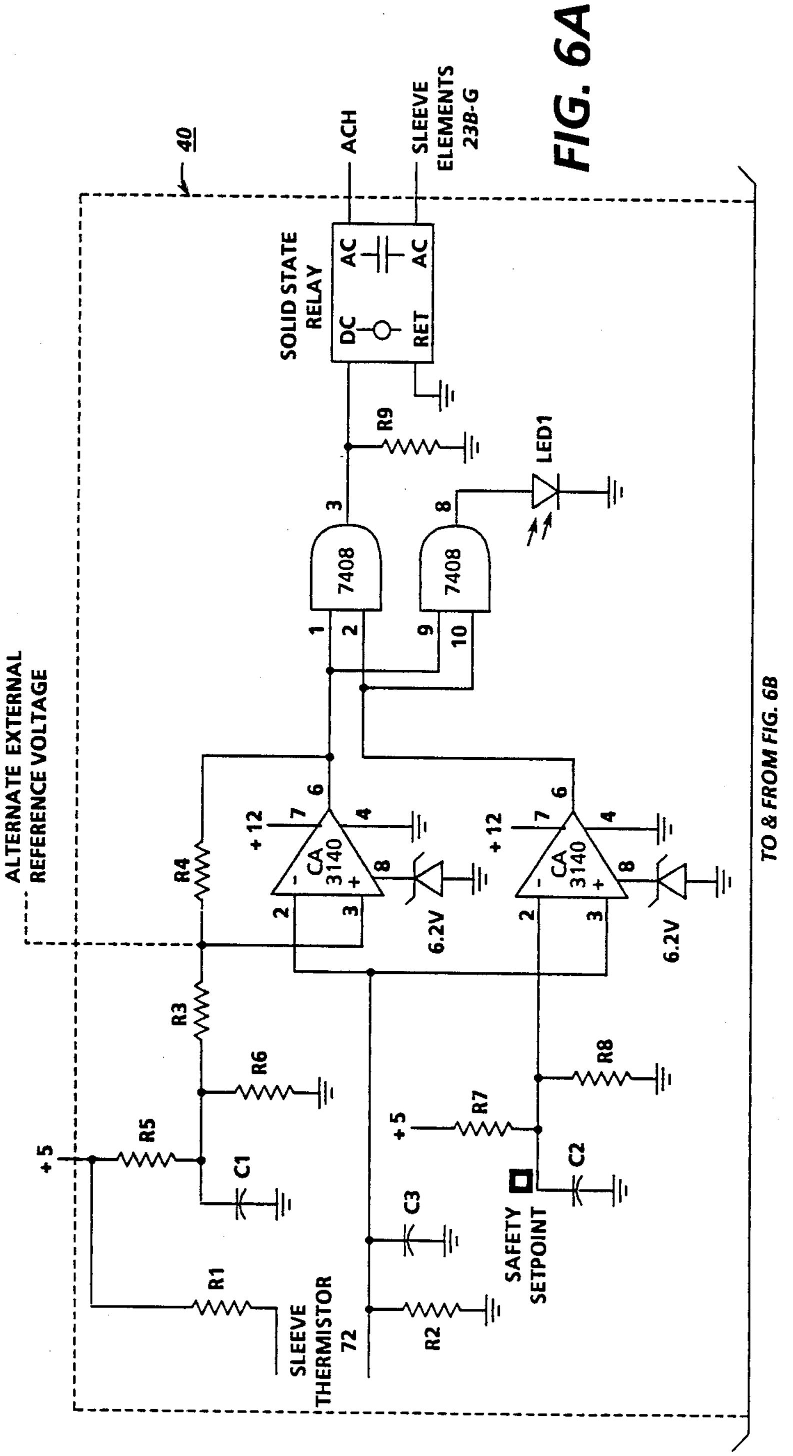
FIGS. 6A and 6B are electrical circuits associated with a specific embodiment of the control circuitry.
Figure 6B:
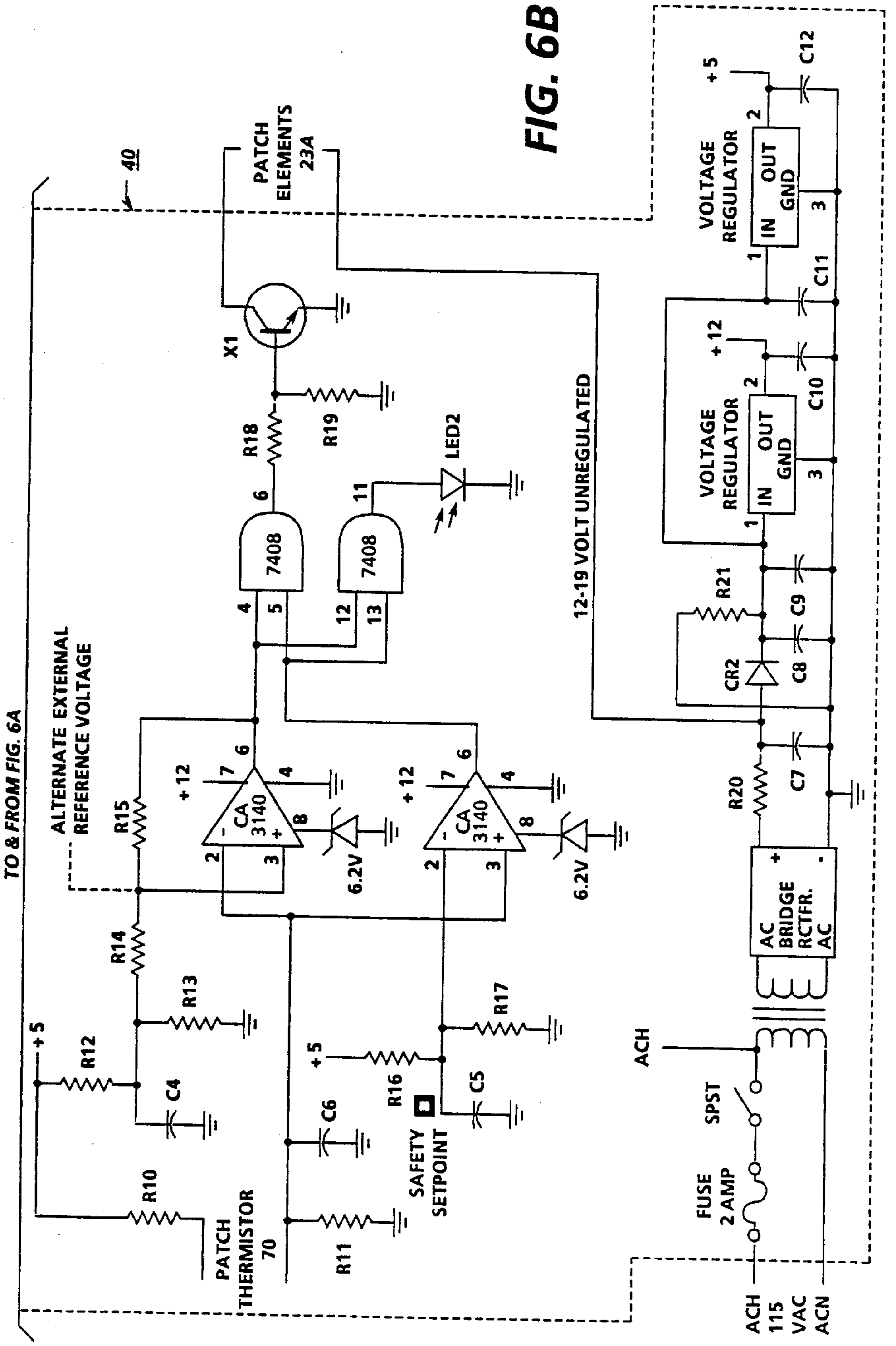

The non-patch sleeve elements were connected to a 115 vac power source and the patch element to a 12 v power source. The non-patch sleeve element wrap angle was 280° and the patch element wrap angle was 90°. Total lamp heater sleeve area was 49.85 sq. in. and total maximum power was 108.71 watts. The sleeve construction was a glass/epoxy laminated with a polymide resin for high temperature operation. The sleeve was controlled so as to maintain a temperature of 130° F. at the sleeve thermistor and the patch element was controlled to a temperature of 203° F. by the circuit shown in FIGS. 6A and 6B.

The above has described an embodiment of the control circuitry performed to maintain amalgam fluorescent lamp at the optimum temperatures. Due to particular loading requirements, certain systems may require additional cooling means to optimize in lamp temperatures. Thus, directional cooling mechanism such as fan blowers may be additionally utilized along the length of the lamp. An exemplary technique for achieving air cooling along the length of a lamp is disclosed, for example, in U.S. Pat. No. 4,751,551.

While the invention has been described with reference to the structure disclosed, it is not confined to the details set forth, but is intended to cover such modifications or changes as may come within the scope of the following claims:

What is claimed is:

1. A monitoring and control system for an amalgam fluorescent lamp, said system including a multi-element lamp heater sleeve adapted to control the amalgam temperature and to provide a non-uniform power density axially across the lamp and control means for sensing temperature along a plurality of areas of said heater sleeve and for adjusting the temperature at each of said areas.

2. The monitoring and control system of claim 1, further including a feedback lamp power supply control circuit.

3. The monitoring and control system of claim 1, wherein said lamp has an amalgam patch located internally and said heater sleeve includes a first heater area of a first density connected to a first power source, said first area aligned with said amalgam patch.

4. The monitoring and control system of claim 3, wherein said heater sleeve further includes a plurality of separate heater elements connected in series and powered by a second power source.

5. The monitoring and control circuit of claim 4, further including at least a first thermistor in contact with said first heater sleeve area and at least a second thermistor in contact with at least one of said plurality of separate sleeve elements, said thermistor electrically connected to said temperature sensing control means.

6. The monitoring and control circuit of claim 1, wherein said amalgam lamp is operated at power voltage of up to 120 watts.

7. The monitoring and control circuit of claim 4, wherein the amalgam temperature is maintained within the range of 28° to 100° C.

8. An electrophotographic printing machine having a scanning system for illuminating longitudinal sections of incremental width of an original document during the scanning thereof and means for exposing a photosensitive medium to the scanned light image, the scanning system including:

an elongated amalgam fluorescent lamp having a lamp heater sleeve affixed to a substantial surface area of the lamp envelope, said heater sleeve comprising a plurality of heater elements of different densities.

a full-rate, half-rate mirror scanning system adapted to move beneath the original document in a scan mode to incrementally illuminate the document and reflect an image into a lens which, in turn, projects the image onto a photosensitive medium, and a high-frequency power supply for providing power to said lamp, the printing machine further including a heater sleeve control means for sensing the temperature along a plurality of said lamp heater sleeve elements, and for providing adjustable power inputs to said elements in response to said sensed temperature inputs.

9. The printing machine of claim 6, further including a photosensor which senses the illumination output of said lamp and sends a signal to said power supply, the power supply including comparator means for comparing the signal from the photosensor with a reference signal and for generating a signal to adjust the output level of the lamp.

* * * * *